United States Patent [19]

Kurita

[11] Patent Number: 4,502,889

[45] Date of Patent: Mar. 5, 1985

[54] SILICONE EMULSION COMPOSITIONS

[75] Inventor: Akitsugu Kurita, Ohta, Japan

[73] Assignee: Toshiba Silicone Co., Ltd., Tokyo, Japan

[21] Appl. No.: 562,801

[22] Filed: Dec. 19, 1983

[30] Foreign Application Priority Data

Dec. 21, 1982 [JP] Japan .................................. 57-227375

[51] Int. Cl.$^3$ ................................................ C09K 3/00
[52] U.S. Cl. ................................ 106/287.12; 524/437; 528/19
[58] Field of Search .................... 106/287.12; 524/437; 528/19

[56] References Cited

U.S. PATENT DOCUMENTS 4,221,688  9/1980  Johnson et al. ...................... 524/247
4,427,811  1/1984  Elias et al. ........................... 524/437

Primary Examiner—Theodore Morris
Attorney, Agent, or Firm—Gary L. Loser

[57] ABSTRACT

A silicone emulsion composition containing a reinforcing amount of alumina sol blended in an emulsion precursor obtained by emulsifying a polydiorganosiloxane having at least one silanol group per molecule, one nonionic surfactant and the remainder water.

6 Claims, No Drawings

SILICONE EMULSION COMPOSITIONS

BACKGROUND OF THE INVENTION

The present application claims priority of Japanese patent application No. 82/227375, filed Dec. 28, 1982.

This invention relates to silicone amulsion compositions, more particularly to silicone emulsion compositions capable of forming a hardened film having excellent heat and water resistance and high film strength after evaporating water in the composition. The compositions of this invention are therefore suited for use as a treating agent for various types of fibers, asbestos, etc., a releasing agent, a release paper treating agent and so forth.

The silicone emulsion compositions to be applied to such uses must be able to form a hardened film upon evaporation of water in the composition. Many types of such silicone emulsion compositions have been proposed heretofore, among which the following two types are most typical. One is a composition which is produced by adding a catalyst such as an organotin compound to an emulsion of a polydiorganosiloxane containing silanol groups or hydrogen atoms bonded to silicon atoms. This type of composition, however, has the disadvantage that heating at a relatively high temperature is required for forming a hardened film and that the hardened film-forming ability is lost a short time after addition of the catalyst. Another type of composition is a polyorganosiloxane latex obtainable by emulsion polymerization of an organoalkoxysilane having amino, epoxy or mercapto groups and a cyclic organsiloxane (Japanese Patent Laid-Open No. 131661/1979). This latex is advantageous in that all the components can be stored in one package, and that heating to a relatively high temperature is not required for forming a hardened film. However, it has a drawback in that the film formed therefrom is subject to certain limitations on its mechanical strength and adhesiveness and is therefore unsuited for use as a coating agent.

In view of these problems on the prior art, the present applicant has pursued further research for a silicone emulsion composition which retains its original properties even if kept in storage for a long time and which is capable of forming a hardened film with high strength and good adhesiveness after evaporation of water contained therein with no need for using a catalyst and, as a result, has succeeded in obtaining a silicone emulsion composition which is free of the prior art problems by blending an alumina sol in an emulsion of a polyorganosiloxane containing silanol groups. The present invention has been completed on the basis of this fact.

SUMMARY OF THE INVENTION

A silicone emulsion composition comprising an effective amount of alumina sol blended in an emulsion precursor obtained by emulsifying:

(A) 1 to 80% by weight of a polydiorganosiloxane having at least one silanol group per molecule, (B) 0.1 to 20% by weight of at least one nonionic surfactant or quaternary ammonium salt surfactant, and (C) 15 to 95% by weight of water.

DESCRIPTION OF THE INVENTION

The present invention provides a silicone emulsion composition comprising an effective amount of alumina sol blended in an emulsion precursor obtained by emulsifying:

(A) 1 to 80% by weight of a polydiorganosiloxane having at least one silanol group per molecule, (B) 0.1 to 20% by weight of at least one nonionic surfactant or quaternary ammonium salt surfactant, and (C) 15 to 95% by weight of water.

The polydiorganosiloxane (A) used in this invention is a component capable of forming a hardened film with the aid of alumina sol, and it is essential for this purpose that such siloxane have at least one silanol group per molecule and preferably both ends of the siloxane molecule are terminated with silanol groups. Also, component (A) is required to have a viscosity preferably within the range of 50 to 1,000,000 cSt, preferably from 100 to 100,000 cSt, at 25° C. If the viscosity of this component is lower than 50 cSt, the silanol group content per unit weight of the polydiorganosiloxane becomes too high due to the reduced molecular weight, resulting in a fragile film formed from this component and alumina sol. On the other hand, if the viscosity exceeds 1,000,000 cSt, it becomes difficult to emulsify component (A) in the presence of components (B) and (C). Also, in such a case it is hard to obtain a stable emulsion by mechanical emulsification of components (A), (B) and (C), but when they are emulsion-polymerized by using an alkaline polymerization catalyst such as potassium hydroxide, it becomes possible to obtain a stable emulsion even if the viscosity is in a high range.

The organic groups bonded to the silicon atoms in polydiorganosiloxane (A) are selected from monovalent substituted and unsubstituted hydrocarbon groups. The unsubstituted hydrocarbon groups usable in this invention are, for example, straight-chain or branched alkyl groups such as methyl, ethyl, hexyl, octyl, decyl, hexadecyl or octadecyl; alkenyl groups such as vinyl and allyl; aryl groups such as phenyl, naphthyl, and xenyl; and aralkyl groups such as benzyl, β-phenylethyl, methylbenzyl or naphthylmethyl. The substituted hydrocarbon groups usable in this invention are, for example, those obtained by substituting hydrogen atoms of the above-cited unsubstituted hydrocarbon groups with halogen atoms such as fluorine or chlorine.

Another example of the monovalent substituted hydrocarbon groups in component (A) may be a carbon-functional group composed of carbon atoms, hydrogen atoms and at least one of nitrogen and oxygen atoms. The emulsion composition using component (A) containing such a carbon-functional group is advantageous as it shows excellent adhesiveness when applied to a base material such as fiber. Examples of such carbon-functional groups are:

—CH$_2$CH$_2$CH$_2$NH$_2$,

—CH$_2$CH$_2$CH$_2$NHCH$_2$CH$_2$NH$_2$,

—CH$_2$CH$_2$cH$_2$NHCH$_2$CH$_2$NHCH$_2$CH$_2$NH$_2$,

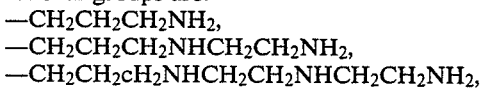

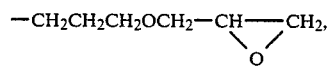

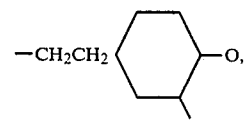

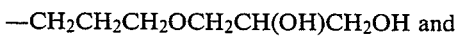

—CH$_2$CH$_2$CH$_2$OCH$_2$CH(OH)CH$_2$OH and

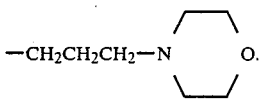

Suitable methods for the synthesis of polydiorganosiloxanes containing such carbon-functional groups is as follows. For example, a polydiorganosiloxane containing amino groups is synthesized by the condensation reaction through alcohol elimination between a polydiorganosiloxane having at least one silanol group and a silane coupling agent having an amino group, or a polydiorganosiloxane containing epoxy or hydroxyl groups is synthesized by the addition reaction of a compound having an epoxy or hydroxyl group and an unsaturated group in the same molecule to a polydiorganosiloxane having hydrogen atoms bonded to the silicon atoms in the presence of a platinum catalyst.

The surfactant used as a component (B) in this invention is a surfactant selected from nonionic surfactants and quaternary ammonium salt surfactants or mixtures thereof. Exemplary of the nonionic surfactants usable in this invention are glycerol fatty acid esters, sorbitan fatty acid esters, polyoxyethylene (POE) alcohol ether, POE sorbitan fatty acid esters, POE glycerol fatty acid esters, POE alkylphenol ether and POE polyoxypropylene block copolymers. Examples of the quaternary ammonium salt surfactants usable in this invention are alkyltrimethylammonium salts such as octadecyltrimethylammonium chloride or hexadecyltrimethylammonium chloride or dialkyldimethylammonium salts such as dioctyldecyldimethylammonium chloride, dihexadecyldimethylammonium chloride or didodecyldimethylammonium chloride; and benzalkonium chlorides such as octadecyldimethylbenzylammonium chloride or hexadecyldimethylbenzylammonium chloride.

The polydiorganosiloxane (A) is emulsified in the presence of at least one of the surfactants (B) and water (C) to obtain an emulsion precursor. The content of the polydiorganosiloxane to be blended is within the range of 1 to 80% by weight, preferably 5 to 50% by weight of the emulsion precursor. If the content of component (A) is less than 1% by weight or above 80% by weight, it becomes difficult to effect the desired emulsification. Also, in case it exceeds 80% by weight, the storage stability of the emulsion precursor after blending with the alumina sol deteriorates. The amount of the surfactant(s) (B) to be blended should be within the range of 0.1 to 20% by weight, preferably 0.5 to 10% by weight, of the emulsion precursor. If the content of component (B) is less than 0.1% by weight, emulsification is hard to achieve, while if it exceeds 20% by weight, the emulsion viscosity increases excessively. In either of these cases, an unstable emulsion is formed. The amount of water (C) to be blended is within the range 15 to 95% by weight and preferably from 40 to 85% by weight of the emulsion precursor. The water content outside this range causes an improper state of emulsification, resulting in formation of an unstable emulsion.

The silicone emulsion composition of this invention can be prepared by blending a suitable amount of alumina sol in an emulsion precursor obtained by emulsifying the above three components (A), (B) and (C) in the manner described above. The term "alumina sol" is used in this invention to signify a sol of alumina in a hydrous state, and such a sol is commercially available as an aqueous dispersion containing usually about 5 to 20% by weight of $Al_2O_3$. The amount of the alumina sol to be blended may be suitably selected, but it is preferable that the amount of $Al_2O_3$ in the alumina sol be within the range of 0.5 to 100 parts by weight per 100 parts by weight of the polydiorganosiloxane (A) in the emulsion precursor. If the amount of alumina sol is less than 0.5 part by weight, the desired film-reinforcing effect may not be provided, resulting in a weakened film strength. If it exceeds 100 parts by weight there is generally noted a tendency that, though a hard film is obtained, its strength is reduced, although the situation may vary depending on the type of the alumina sol used.

The thus obtained silicone emulsion composition requires no addition of a hardening catalyst and all the components can be kept stably in one package for a long time. In order to form a hardened film therefrom, it suffices to merely evaporate water contained in the composition. It is possible to apply a heat treatment to effect water evaporation at an increased rate. Further, since the composition of this invention is composed of a blend of a polydiorganosiloxane having silanol groups and alumina sol, the hardened film formed therefrom has a very high strength and a good adhesiveness as seen in the results of the examples described below.

As described above, the present invention has realized simultaneous fulfillment of requirements for both good storage stability and formation of a strong film by water evaporation, which was unachievable with conventional silicone emulsion compositions. The silicone emulsion composition of the present invention can be advantageously applied as a treating agent for fibers, asbestos and such, a releasing agent, a release paper treating agent, or the like.

The present invention will now be described in further detail by way of embodiments thereof, but the invention is not limited in any way by these embodiments. In the following descriptions of the embodiments, all "parts" are by weight unless otherwise noted.

EXAMPLES

Example 1

20 parts of polydimethylsiloxane blocked at both ends with silanol groups and having a viscosity of 1,000 cSt at 25° C. was mixed with 4 parts of dihexadecyldimethylylammonium chloride, 1 part of sorbitan monostearate added with 20 mol of polyoxyethylene and 75 parts of water, and the mixture was passed through a colloid mill with mill intervals of 10 mil to obtain a precursor emulsion A.

Then 30 parts of alumuna sol B ($Al_2O_3$ content: 10% by weight; pH=4) was blended with 70 parts of said emulsion A to obtain a composition C.

This composition C was placed in an aluminum laboratory dish and dried by heating at 120° C. for one hour. As a result there was obtained a hardened film excellent in both film strength and adhesiveness.

Comparative Example 1

The emulsion A obtained in Example 1 with no alumina sol blended therein was placed in an aluminum laboratory dish and dried by heating in the same way as Example 1. As a result there remained an oily substance, and no hardened film was obtained.

Example 2

30 parts of octamethylcyclotetrasiloxane, 3 parts of dioctadecyldimethylammonium chloride, 66.5 parts of water and 0.5 part of potassium hydroxide were stirred and mixed, and the mixture was emulsified by passing it through a colloid mill with mill intervals of 10 mil. The obtained emulsion was stirred under heating at 75° C. for 3 hours, then cooled to 40° C. while continuing stirring and neutralized with hydrochloric acid to obtain a precursor emulsion emulsion D.

The results of an analysis of this emulsion D showed that the base oil thereof was a polydimethylsiloxane blocked at both ends with silanol groups and having a viscosity of 5,000 cSt at 25° C.

Then 20 parts of alumina sol E ($Al_2O_3$ content: 8% by weight; pH=5) was blended with 80 parts of said emulsion D to obtain a composition F.

When this composition F was dried by heating at 60° C. for 2 hours in an aluminum laboratory dish there was obtained a hardened film having a rubber-like elasticity and a high film strength.

Comparative Example 2

The emulsion D obtained in Example 2 with no alumina sol blended therein was heated and dried in an aluminum laboratory dish in the same way as in Example 2. As a result there remained a slightly viscous oily substance and no hardened film was obtained.

Example 3

85 parts of polydimethylsiloxane blocked at both ends with silanol groups and having a viscosity of 1,000 cSt at 25° C. and 15 parts of γ-(N-β-aminoethylamino) propylmethyldimethoxysilane were stirred and heated at 80° C. for 3 hours under reduced pressure to obtain a base oil G having a viscosity of 2,500 cSt at 25° C. 25 parts of this base oil G was stirred and mixed with 3 parts of dihexadecyldimethylammonium chloride, 2 parts of stearate added with 15 mol of polyoxyethylene and 70 parts of water, and the mixture was passed through a colloid mill with mill intervals of 10 mil to obtain a precursor emulsion H.

Then 30 parts of alumina sol B (the same one as used in Example 1) was blended with 70 parts of said precursor emulsion H to obtain emulsion.

When this emulsion I was dried by heating at 120° C. for one hour in an aluminum laboratory dish, there was obtained a hardened film having a high film strength and good adhesiveness.

Comparative Example 3

The emulsion H in Example 3 with no alumina sol blended therein was heated and dried in the same way as in Example 3. As a result, a slightly viscous, oily substance was left, and no hardened film was obtained.

Example 4

80 parts of a polymethylphenylsiloxane containing 30 mole percent diphenylsiloxy units and 70 mole percent dimethylsiloxy units, blocked at both ends with silanol groups and having a viscosity of 800 cSt at 25° C. was stirred and heated at 80° C. with 10 parts of γ-aminopropyltriethoxysilane and 10 parts of β-(3,4-epoxycyclohexyl) ethyltrimethoxysilane for 5 hours under reduced pressure to obtain a base oil J having a viscosity of 1,700 cSt at 25° C. Then 30 parts of this base oil J was stirred and mixed with 2 parts of hexadecyltrimethylammonium chloride, 2 parts of dioctadecyldimethylammonium chloride and 66 parts of water, and the mixture was passed through a colloid mill with mill intervals of 10 mil to obtain a precursor emulsion K.

Then 25 parts of alumina sol L ($Al_2O_3$ content: 15% by weight; pH=4) was blended with 75 parts of said emulsion K to obtain a composition M.

When this composition M was dried by heating at 120° C. for one hour in an aluminum laboratory dish there was obtained a hardened film having a high film strength and an excellent adhesiveness.

Comparative Example 4

The emulsion K obtained in Example 4 with no alumina sol blended therein was heated and dried in the same way as in Example 4, but a low viscosity oily substance was left, and no hardened film was obtained.

A fabric was treated under the following conditions with each of the compositions C, F, I and M in the respective examples described above, and each of the emulsions A, D, H and K of the respective comparative examples to which no alumina sol was added. The obtained data are shown in Table 1.

Treating bath: A solution prepared by diluting each composition 30 times with water.
Treated fabric: Cotton knit fabric.
Treating metod: The fabric was immersed once in each solution, then squeezed (squeeze rate: 100%), dried at 120° C. for 5 minutes and subjected to a heat treatment at 180° C. for 3 minutes.
Testing method: Impact resilience and sense of slipperiness were judged by hand and yellowing was determined by a visual observation. Fastness to dyeing was measured by a test method according to JIS L0849.

As seen from these results the composition of this invention causes no ill effect on yellowing or fastness to dyeing, gives a relatively good sense of slipperiness and excellent impact resilience and is therefore suited for use as a treating agent for fibers, fabrics, or the like.

TABLE 1

| Composition | Items for Evaluation | | | |
|---|---|---|---|---|
| | Impact resilience | Sense of slipperiness | Yellowing | Fastness to dyeing (grade) |
| A(comparative example) | bad | felt | none | 5–4 |
| C | good | slightly felt | none | 5–4 |
| D(comparative example) | bad | felt | none | 5–4 |
| F | good | slightly felt | none | 5–4 |
| H(comparative example) | bad | felt | yellowed | 4–3 |
| I | good | slightly felt | slightly yellowed | 4 |
| K(comparative example) | bad | felt | yellowed | 3–4 |
| M | best | slightly felt | slightly yellowed | 4–3 |

I claim:
1. A colloidal silica free silicone emulsion composition comprising a reinforcing amount of alumina sol blended in an emulsion precursor obtained by emulsifying:
    (A) 1 to 80% by weight of a polydiorganosiloxane having at least one silanol group per molecule,
    (B) 0.1 to 20% by weight of at least one nonionic surfactant or quaternary ammonium salt surfactant or mixtures thereof, and
    (C) 15 to 95% by weight of water.
2. A silicone emulsion composition according to claim 1 wherein polydiorganosiloxane (A) is one which is blocked at both ends with silanol groups and has a viscosity of 50 to 1,000,000 cSt at 25° C.

3. A silicone emulsion composition according to claim 1 wherein the organic groups bonded to polydiorganosiloxane (A) include at least one carbon-functional group composed of carbon atoms, hydrogen atoms and either one or both of nitrogen and oxygen atoms.

4. A silicone emulsion composition according to claim 1 wherein the emulsion precursor obtained by the emulsification of (A), (B) and (C) is one formed by subjecting said materials to an emulsion polymerization in the presence of a polymerization catalyst.

5. A silicone emulsion composition according to claim 4 wherein potassium hydroxide is used as the polymerization catalyst.

6. A silicone emulsion composition according to claim 1 wherein the amount of the alumina sol blended is within the range of 0.5 to 100 parts by weight in terms of $Al_2O_3$ contained in the alumina sol per 100 parts by weight of the diorganopolysiloxane of (A).

* * * * *